United States Patent
Arachchige et al.

(10) Patent No.: US 8,085,433 B2
(45) Date of Patent: Dec. 27, 2011

(54) VARIABLE/PERSONALIZED COLORIZATION PRINTING USING TONE REPRODUCTION CURVES

(75) Inventors: Somi Ruwan Budhagoda Arachchige, Rochester, NY (US); Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 861 days.

(21) Appl. No.: 11/771,174

(22) Filed: Jun. 29, 2007

(65) Prior Publication Data

US 2009/0003689 A1  Jan. 1, 2009

(51) Int. Cl.
*H04N 1/60* (2006.01)
(52) U.S. Cl. ....... 358/1.9; 358/3.23; 358/3.26; 358/518; 358/521; 358/523; 382/167
(58) Field of Classification Search .................. 358/1.1, 358/1.9, 3.26–3.27, 518–523
See application file for complete search history.

(56) References Cited

U.S. PATENT DOCUMENTS

| | | | | |
|---|---|---|---|---|
| 5,285,291 A | * | 2/1994 | Schiller | 358/453 |
| 5,687,303 A | * | 11/1997 | Motamed et al. | 358/1.18 |
| 5,768,425 A | * | 6/1998 | Praveen et al. | 358/3.22 |
| 6,484,631 B2 | * | 11/2002 | Degani et al. | 101/171 |
| 6,535,300 B2 | * | 3/2003 | Hisada | 358/1.4 |
| 6,906,828 B2 | * | 6/2005 | VanDuyn et al. | 358/2.1 |
| 6,914,697 B2 | * | 7/2005 | Hamura et al. | 358/1.17 |
| 6,937,773 B1 | * | 8/2005 | Nozawa et al. | 382/243 |
| 7,379,207 B2 | * | 5/2008 | Harrington | 358/1.9 |
| 7,450,270 B2 | * | 11/2008 | He et al. | 358/3.2 |
| 2004/0012817 A1 | * | 1/2004 | Brewington et al. | 358/3.06 |
| 2004/0263908 A1 | * | 12/2004 | Jacobs et al. | 358/2.1 |
| 2006/0132825 A1 | | 6/2006 | Czudak et al. | |
| 2006/0238800 A1 | | 10/2006 | Czudak et al. | |
| 2007/0041035 A1 | | 2/2007 | Sembower et al. | |

* cited by examiner

*Primary Examiner* — King Poon
*Assistant Examiner* — Richard Zhu
(74) *Attorney, Agent, or Firm* — Fay Sharpe LLP

(57) ABSTRACT

Disclosed herein is a method wherein each pixel is tagged with a special VI (Variable Information) flag, which indicates the color of the pixel is variable or fixed. When the document gets created during raster image processing ("ripping"), the output CMYK of the VI and non-VI pixels are constrained to be odd and even numbers, respectively. In the meantime, a special TRC is created, and the VI colors are obtained through this special TRC at the odd indices, while the non-VI colors are obtained through the even indices. To enable the variable colorization printing, the job needs to be ripped once and saved. The saved job then can be reprinted multiple times with different TRCs that have the same values at the even indices, but different values at the odd indices.

23 Claims, 5 Drawing Sheets

VARIABLE/PERSONALIZED COLORIZATION PRINTING USING TONE REPRODUCTION CURVES

BACKGROUND

The exemplary embodiment relates to Variable Information Printing. While it is particularly directed to the art of digital image processing, and will be thus described with specific reference thereto, it will be appreciated that the exemplary embodiment may have usefulness in other fields and applications.

By way of background, Variable Information Printing (or VIP) is a form of on-demand printing in which elements such as text, graphics and images may be changed from one printed piece to the next without stopping or slowing down the press, using information from a database or external file. Color variability without ripping is currently not addressed in VIP printing, where the color could be customized in all the object types depending on the customer or market preferences. For example, consider an automobile marketing campaign in which customer "A" would like a black car with a white graphical design. At the same time, this would not be appealing to customer "B" who would like to see the same car with a blue graphical design. Currently, this could be achieved only by "ripping" the document with different sets of objects. This affects overall performance and requires extensive upstream manual process on each object.

Thus, there is a need for a procedure which enables customer to create variable/personalized color images during the rip time without changing the document. This provides the user with the flexibility of changing color in a specific object without extra time and money.

BRIEF DESCRIPTION

According to one aspect of the exemplary embodiment, a method of processing a variable information (VI) document containing tagged pixels is provided. The method comprises: pre-processing the tagged VI document; performing raster image processing (RIP) on the tagged VI document and then saving the tagged VI document; and rendering the tagged VI document through an original tone reproduction curve (TRC).

According to another aspect of the exemplary embodiment, an apparatus for processing a variable information (VI) document containing tagged pixels is provided. The apparatus comprises: an image source; an image processing unit; and an image rendering unit.

DETAILED DESCRIPTION

Figure 1:
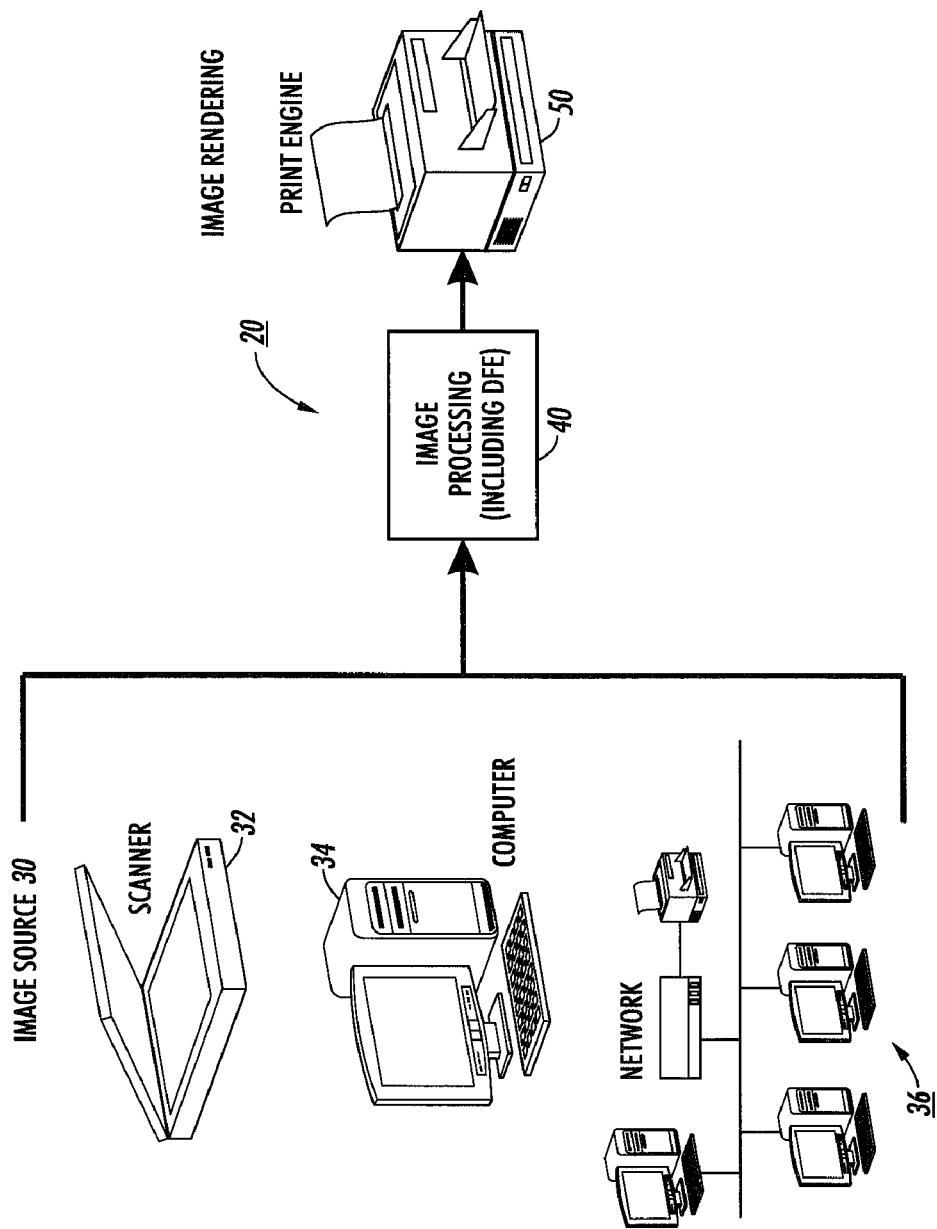
FIG. 1 is a general representation of a suitable system for implementing one or more aspects of the exemplary embodiment.

As used herein the term "data" refers generally to physical signals that indicate or include information. An "image", i.e., a pattern of physical light, may include "image objects" in the form of characters, words, and text as well as other features such as line art, graphics, or graphical structures. An image may be divided into "segments," each of which is itself an image. A segment of an image may be of any size up to and including the whole image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image.

These contone (color) pixel levels are generally continuous from one pixel to another. In some systems, however, there are additional numeric values called "tags" associated with each pixel, which may describe how the pixel is to be rendered. For example, these tags (known also as "rendering intents" or "rendering hints") may specify to the rendering stage which halftone is to be used for a printing application. In contrast to the contone (color) pixel levels, where color values are continuous, numerically adjacent tag values are in general not related. For example one pixel on the border of one object may have a tag value of 5 (150 cluster dot) associated with it. An adjacent pixel, which is associated with another type of object may have a tag value of 6 (300 line screen). The tag values of 5 and 6 are close, but the rendering hint they each refer to provide significantly different rendering outputs. If the digital image processing system produces the image in its original format, i.e., including all pixels, each pixel is rendered according to the correct tag.

Thus, the term "tag" (or "hint") refers to complimentary data to be used in conjunction with the digital contone data to optimally render each pixel of a digital image. Each pixel of the contone plane is assumed to have a corresponding pixel in the tag plane.

A "color" may refer, for example, to the appearance of an image, a printed space, and/or a printed reference described in terms of a person's perception of their hue and lightness (or brightness) and saturation. A "colorant" may refer, for example, to cyan (C), magenta (M), yellow (Y), and/or black (B) inks or dyes (or other color inks or dyes) used to reproduce a color of a given pixel in an original image. A "substrate" may refer, for example, to a printable sheet such as paper. A "colorant value" or "color value" may refer, for example, to a C, M, Y, or K (or another color component, e.g., red (R), green (G), or blue (B)) intensity value at a particular pixel location, and such a value may, e.g., be used to control the amount of colorant applied to a substrate by an imaging system. A "match" may refer, for example, to a combination of colorants that most visually resemble a reference color, has similar visual characteristics as a reference color, coincides in visual characteristics with a reference color, is similar to in colorant value as a reference color, and/or is equal in colorant value as a reference color.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

"Graphical features," "line art objects" and "text" typically refer to computer-generated features in an image as opposed to pictorial or natural scene content. The terms may also be used to describe computer-generated features that have been printed and re-digitized with a device such as an input scanner.

The term "run" refers to representation of a string of contiguous pixels whereby each of the pixels has a common attribute, such as color or tag value. The run is represented by a start position, an end position or length, and the common attribute, such as color or tag value. The term "run length encoding" is a data compression method whereby the digital signals corresponding to an image are represented as a series of contiguous runs.

For a general understanding of the exemplary embodiment, reference is now made to the drawings. In the drawings, like reference numerals have been used throughout to designate identical elements. Turning now to FIG. 1, depicted therein is an embodiment of a digital imaging system 20 suitable for implementing aspects of the exemplary embodiment. In the system 20, an image input device 30 is used to generate image data that is supplied to an image processing system 40, that may incorporate what is known in the art as a digital front end (DFE), and which produces binary data for image rendering by a print engine 50. For example, the image source 30 may include a scanner 32, a computer 34, a network 36 or any similar or equivalent image input terminal. On the output end, the image output device (or print engine) 50 is preferably a xerographic engine; however, the print engine 50 may include such equivalent alternatives as ink jet, etc. The exemplary embodiment is directed towards aspects of the image processor 40 depicted in FIG. 1.

The digital imaging system 20 may exhibit a drift in the color response of the print engine 40, either over time or as a result of a number of factors. In order to compensate for the drift, a tone reproduction curve (TRC) may be used for each of the printer colorants. A TRC is a modeled mathematical relationship between the input color values and the colorant amounts that must be sent to the imaging device in order to produce the intensities specified by the input color values. The TRC is a continuous curve on a plot of input color values versus output colorant values that represents a best fit of the discrete data points matching each input color value with an output colorant value that, when rendered on the given device, produces the intensity specified by the input color value.

For a CMYK printer, colorants are cyan (C), magenta (M), yellow (Y), and black (B) inks or dyes used to reproduce a color of a given pixel in an original image. A TRC may be implemented as a look-up-table (LUT) that maps input color values to output color values. Input color values may, for example, represent C, M, Y, K intensity values at a particular pixel that are used to control the amounts of colorant applied to a substrate (e.g., a printable sheet such as paper) by the imaging system 20. Output color values may, for example, represent C, M, Y, K intensity values obtained in a calibration process by measuring the colors printed on a substrate at different patches. The output color values may be labeled according to their deviation from a reference color value, for example, +1% cyan, −1% yellow. The mapping of input values to output values may further include calculating an error value. In some systems, this error value represents, for example, a deviation of the measured output color values from reference color values. The input color values are adjusted in accord with a given algorithm to reduce error values. The adjustment of input values may compensate for a drift in the color response of a printing device.

The DFE has the capability of recognizing various objects embedded in PDL masters, for example text, stroke, and fills. These objects can then be used to optimize the processing of the contone data prior to transmission to the print engine 50. For some print engines, it is also possible to supply rendering "hints" or "tags" for each pixel, allowing the engine to optimally render the objects on the page. The tags may simply be halftone screen specifications, and the DFE has complete control over the way each pixel is rendered. In some systems, there is an intermediate rendering stage, sometimes referred to as a Contone Rendering Module (CRM).

Figure 2:
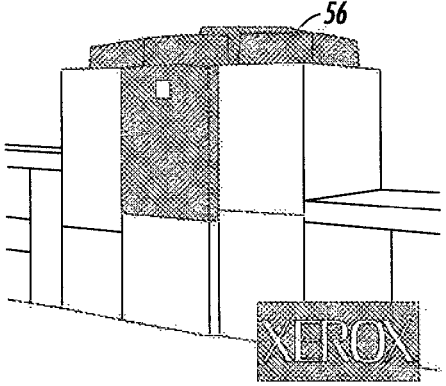
FIG. 2 shows a sample variable information document.

FIG. 2 is an example of a tagged VI document 54. In this example, the color of at least two image objects 56 is to be variable. For example, the objects 56 are to be printed in cyan for some copies and in blue for the others.

Figure 3:
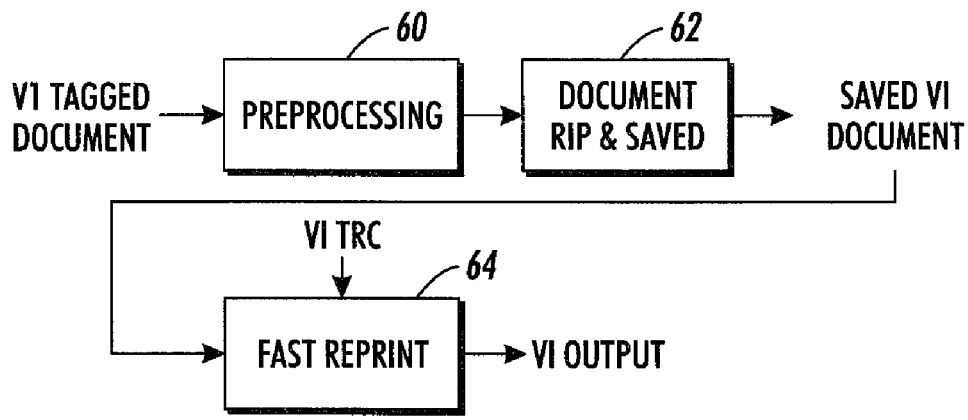
FIG. 3 is a diagram illustrating the exemplary method.

FIG. 3 is a flow diagram of the exemplary variable information processing method. As shown in FIG. 3, the tagged VI document 54 is pre-processed (60), the tagged VI document 54 is then ripped and saved (62), and the variable information is rendered through a TRC (64).

Figure 4:
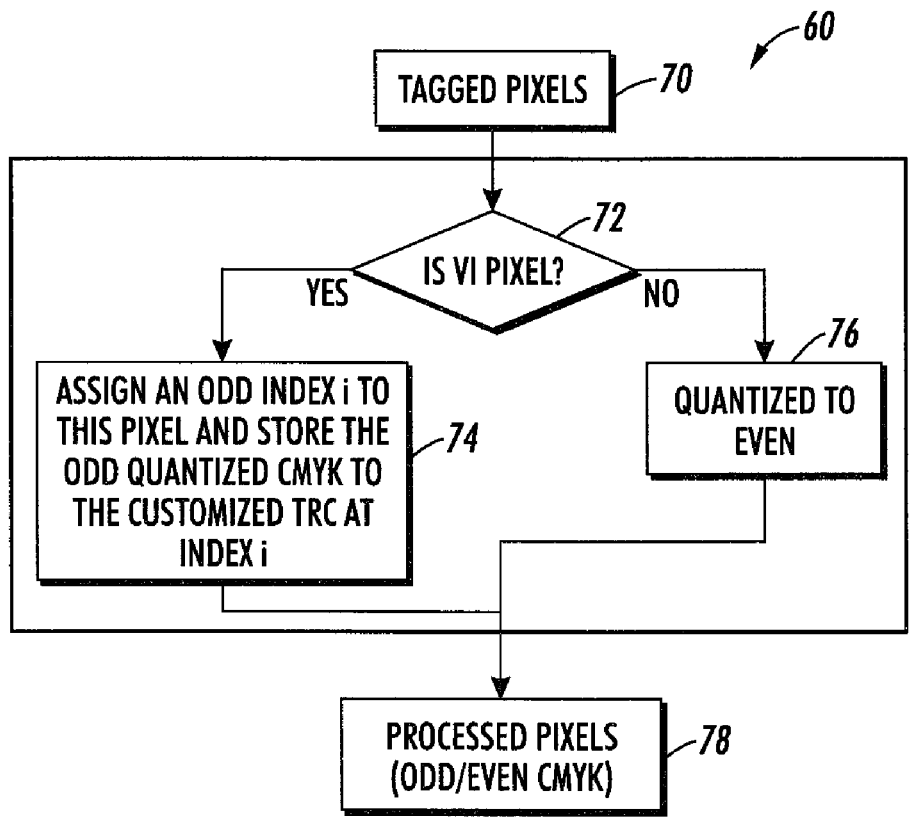
FIG. 4 is a diagram illustrating pre-processing of the VI document.

FIG. 4 illustrates the pre-processing step 60. Before pre-processing, the document has to be tagged. Tagging of the VI pixels can be done by using a tool which is incorporated in the DFE. This tool enables the user to define the VI areas within a document and assign a set of colors and page range each color should be applied when printing the document. As an example, let us assume the user is printing a document with 100 pages, which has 10 sets and each set has an image which needs customized color. So, the user could use this tool to define the customized image area and assign different colors (CMYK values) for each set. Tagging of the VI pixels can also be done in the application, where it provides a special flag for the DFE to consume.

During the pre-process, the DFE recognizes these tags and determines whether each of the tagged pixels 70 is a VI pixel (72). If so, then assign an odd index i to the given pixel and store the odd quantized CMYK to the customized TRC at index i (74). The odd quantized CMYK is computed using the following equations:

$$C'=\text{floor}(C/2)*2+1$$

$$M'=\text{floor}(M/2)*2+1$$

$$Y'=\text{floor}(Y/2)*2+1$$

$$K'=\text{floor}(K/2)*2+1$$

For example, if the input cyan values are 0, 1, 2, 3, ... 254, 255, the quantized cyan output will be 1, 1, 3, 3, ... 255, 255.

Otherwise, the given pixel is quantized to even (76) using the following equations:

$$C'=\text{floor}(C/2)*2$$

$$M'=\text{floor}(M/2)*2$$

$$Y'=\text{floor}(Y/2)*2$$

$$K'=\text{floor}(K/2)*2$$

The output is a set of processed pixels (odd/even CMYK) (78). This preprocessing can be done offline, for example, in the application or in preprocessing within the DFE.

Figure 5:
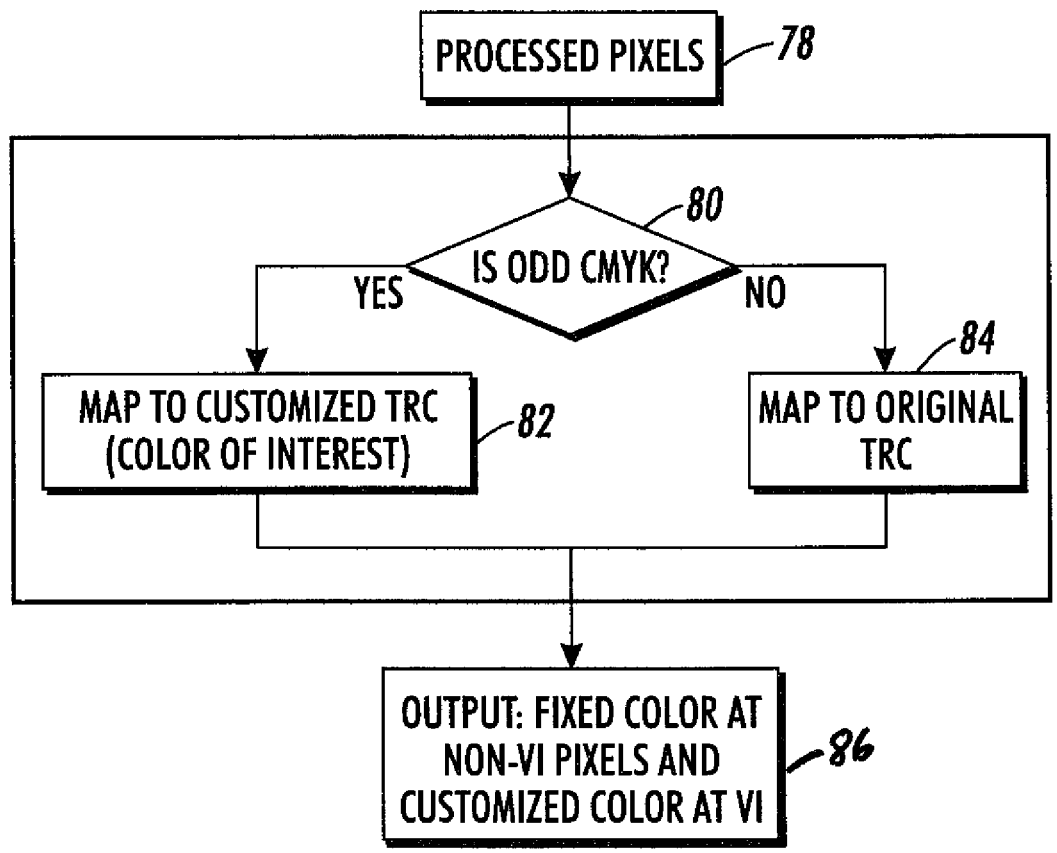
FIG. 5 is a diagram illustrating rendering of the VI document.
Figure 6:
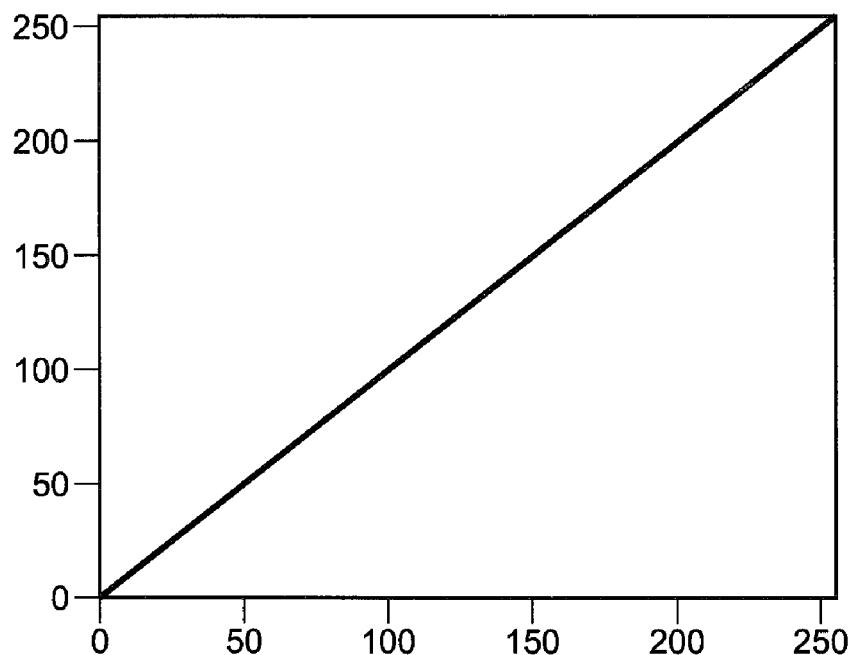
FIG. 6 shows an original TRC.
Figure 7:
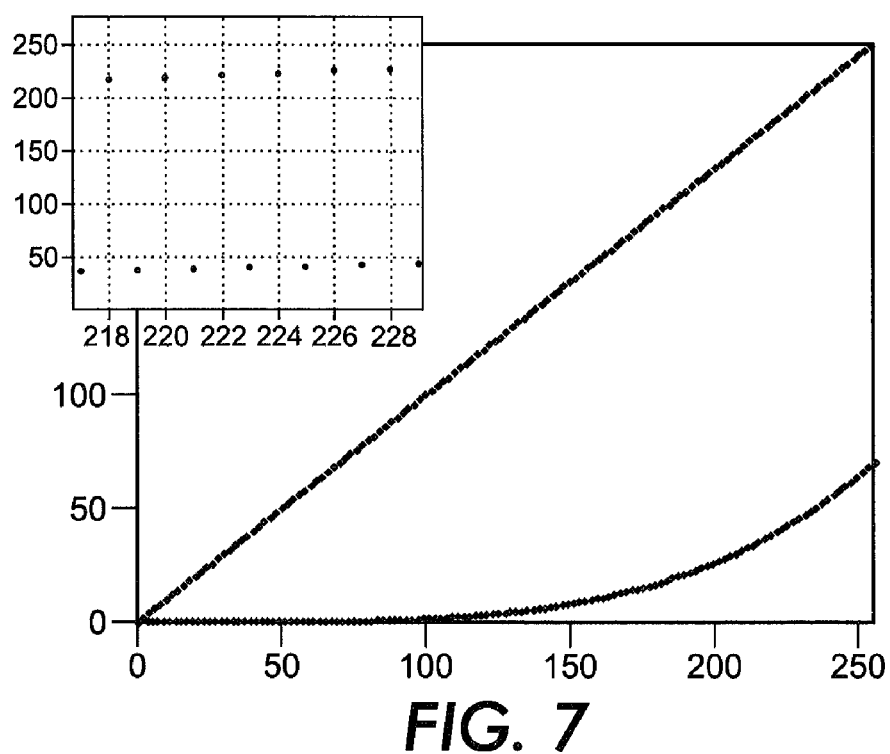
FIG. 7 shows a customized TRC.

FIG. 5 illustrates the rendering step 64. This may be implemented through a single TRC, which has customized TRC values at the odd indices. The customized TRCs are generated based on the user provided customized color in the tagging step (customized CMYK values). As an example, if you want to turn orange to red, you just need to alter the magenta curve. So, if orange is [1,101,201,1], setting the magenta curve at index 101 to 200 will make the final color [1,200,201,1], which is red. Also, the original TRC (shown in FIG. 6) may be used as the customized TRC. In FIG. 7, the magnified subplot shows that the values at even and odd indices are essentially consisting of two TRCs.

For each of the processed pixels 78, determine whether it is "odd" or "even" (80). For example, the odd CMYK values (variable color images) could be mapped to a customized TRC value (82), while even CMYK values (non-variable color images) are kept in the original TRC values (84). Thus, in this case, the output 86 will have fixed color at the non-VI pixels and customized color at the VI pixels. When the job gets ripped and saved, each time when the document is reprinted, depending on the customer preference, different colors could be achieved by applying different customized TRCs for the VI objects. The customized TRCs can be as many as possible, but for one specific color variation output for the same input, only one customized TRC will be applied, Although the VI and non-VI sets are represented by the odd and even numbers, other categories can also be used. For example, 0-100 will represent a non-VI set and 101-255 will represent a VI set. The final TRC values at indices 0-100 will have the full range of colors in the non-VI pixels, and the TRC values at indices 101-255 will vary depending on the customized colors. The classification set is not restricted here.

Thus, as disclosed herein, each pixel is tagged with a special VI (Variable Information) flag, which indicates the color of the pixel is variable or fixed. When the document gets created during raster image processing ("ripping"), the output CMYK of the VI and non-VI pixels are constrained to be odd and even numbers, respectively. In the meantime, a special TRC is created, and the VI colors are obtained through this special TRC at the odd indices, while the non-VI colors are obtained through the even indices. To enable the variable colorization printing, the job needs to be ripped once and saved. The saved job then can be reprinted multiple times with different TRCs that have the same values at the even indices, but different values at the odd indices.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of processing a variable information (VI) document containing tagged pixels, the method comprising:
   pre-processing the tagged VI document with an image processing unit by quantizing at least one pixel with an odd index value, wherein pre-processing further comprises: determining if each one pixel is tagged as being defined by a variable or a fixed colorant, quantizing each one pixel tagged as being defined by the fixed colorant with an even index value, assigning the odd index value to the at least one pixel tagged as being defined by the variable colorant, and storing odd quantized colorant values in the customized TRC;
   computing an odd or even quantized colorant value for the at least one pixel utilizing one or more floor functions; and,
   rendering a variable pixel colorant for the tagged VI document through a customized tone reproduction curve (TRC).

2. The method of claim 1, further comprising:
tagging each pixel within a VI object with a special VI flag which indicates whether the color of the pixel is variable or fixed.

3. The method of claim 1, wherein the odd quantized colorant value is computed using the following equations:

$$C'=\text{floor}(C/2)*2+1;$$

$$M'=\text{floor}(M/2)*2+1;$$

$$Y'=\text{floor}(Y/2)*2+1;$$

$$K'=\text{floor}(K/2)*2+1.$$

4. The method of claim 3, wherein an even quantized colorant value is computed using the following equations:

$$C'=\text{floor}(C/2)*2;$$

$$M'=\text{floor}(M/2)*2;$$

$$Y'=\text{floor}(Y/2)*2;$$

$$K'=\text{floor}(K/2)*2.$$

5. The method of claim 1, wherein rendering the tagged VI document further comprises:
for each of the processed pixels, determining whether it is odd or even;
mapping the odd index colorant values to a customized TRC value;
mapping even index colorant values to original TRC values; and
generating an output having fixed color at tagged non-VI pixels and customized color at tagged VI pixels.

6. An apparatus for processing a variable information (VI) document containing tagged pixels, the apparatus comprising:
an image source that generates image data;
an image processing unit that produces binary data for image rendering, the image processing unit being operative to quantize each one pixel with an index value, compute an odd or even quantized colorant value for the at least one pixel utilizing as a variable in one or more floor functions an input colorant value for the each one pixel, map the quantized colorant value to a customized or an original tone reproduction curve, and render pixel colorant for the each one pixel utilizing the customized or the original tone reproduction curve, wherein the index value determines one of the original or the tone reproduction curve that the quantized colorant value is mapped to, wherein the image processing unit is further operative to: determine if the each one pixel is tagged as being defined by a variable or a fixed colorant, quantize the each one pixel tagged as being defined by the fixed colorant with an even index value and the each one pixel tagged as being defined by the variable colorant with an odd index value and store odd quantized colorant values in the customized TRC curve; and
an image rendering unit that provides an image output including the pixel colorant at each one pixel.

7. The apparatus of claim 6, wherein the image source comprises a scanner, a computer, or a network.

8. The apparatus of claim 6, wherein the image processing unit comprises a digital front end (DFE).

9. The apparatus of claim 6, wherein the image rendering unit comprises a print engine.

10. The apparatus of claim 6, wherein the image source comprises a scanner, a computer, or a network, the image processing unit comprises a digital front end (DFE), and the image rendering unit comprises a xerographic print engine.

11. The apparatus of claim 6, wherein the image processing unit is adapted to:
pre-process the tagged VI document; and
perform raster image processing (RIP) on the tagged VI document and then save the tagged VI document.

12. The apparatus of claim 6, wherein the quantized colorant value for the odd index values is computed using the following equations:

$$C'=\text{floor}(C/2)*2+1;$$

$$M'=\text{floor}(M/2)*2+1;$$

$$Y'=\text{floor}(Y/2)*2+1;$$

$$K'=\text{floor}(K/2)*2+1.$$

13. The method of claim 12, wherein the quantized colorant value for the even indexed values is computed using the following equations:

$$C'=\text{floor}(C/2)*2;$$

$$M'=\text{floor}(M/2)*2;$$

$$Y'=\text{floor}(Y/2)*2;$$

$$K'=\text{floor}(K/2)*2.$$

14. The apparatus of claim 13, wherein the image rendering unit is further adapted to:
determine whether each of the processed pixels is odd or even;
map the odd CMYK values to a customized TRC value;
map even CMYK values to the original TRC values; and
generate an output having fixed color at the non-VI pixels and customized color at the VI pixels.

15. The apparatus of claim 6, wherein the image rendering unit is further adapted to:
determine whether each of the processed pixels is odd or even;
map odd CMYK values to a customized TRC value;
map even CMYK values to the original TRC values; and
generate an output having fixed color at the non-VI pixels and customized color at the VI pixels.

16. The apparatus of claim 1, wherein the image rendering unit is further adapted to store even quantized colorant values in an original TRC curve.

17. The method of claim 1, further including:
computing the odd quantized colorant value utilizing as a variable an input colorant value for the at least one pixel;
performing raster image processing (RIP) on the tagged VI document by mapping the odd quantized colorant value to the customized tone reproduction curve (TRC); and,
saving the tagged VI document.

18. A method of processing a variable information (VI) document containing tagged pixels, the method comprising:
pre-processing the tagged VI document with an image processing unit by quantizing at least one pixel with an odd index value, wherein pre-processing further comprises: determining if each one pixel is tagged as being defined by a variable or a fixed colorant; quantizing each one pixel tagged as being defined by the fixed colorant with an even index value; assigning the odd index value to the at least one pixel tagged as being defined by the variable colorant; and storing odd quantized colorant values in the customized TRC;

computing an odd quantized colorant value using the following equations:

$C'=\text{floor}(C/2)*2+1;$ $M'=\text{floor}(M/2)*2+1;$ $Y'=\text{floor}(Y/2)*2+1;$ $K'=\text{floor}(K/2)*2+1;$ computing an even quantized colorant value using the following equations:

$C'=\text{floor}(C/2)*2;$ $M'=\text{floor}(M/2)*2;$ $Y'=\text{floor}(Y/2)*2;$ $K'=\text{floor}(K/2)*2$ rendering a variable pixel colorant for the tagged VI document through a customized tone reproduction curve (TRC).

19. The method of claim 18, further comprising:
tagging each pixel within a VI object with a special VI flag which indicates whether the color of the pixel is variable or fixed.

20. The method of claim 19, wherein rendering the tagged VI document further comprises:
for each of the processed pixels, determining whether it is odd or even;
mapping the odd index colorant values to a customized TRC value;
mapping even index colorant values to original TRC values; and
generating an output having fixed color at tagged non-VI pixels and customized color at tagged VI pixels.

21. An apparatus for processing a variable information (VI) document containing tagged pixels, the apparatus comprising:
an image source that generates image data;
an image processing unit produces binary data for image rendering, the image processing unit is adapted to quantize each one pixel with an index value, compute a quantized colorant value utilizing as a variable an input colorant value for the each one pixel, map the quantized colorant value to a customized or an original tone reproduction curve, and render pixel colorant for the each one pixel utilizing the customized or the original tone reproduction curve, wherein the index value determines one of the original or the tone reproduction curve that the quantized colorant value is mapped to, wherein the image processing unit is further adapted to: pre-process the tagged VI document, perform raster image processing (RIP) on the tagged VI document and then save the tagged VI document, determine if the each one pixel is tagged as being defined by a variable or a fixed colorant, quantize the each one pixel tagged as being defined by the fixed colorant with an even index value and the each one pixel tagged as being defined by the variable colorant with an odd index value, and store odd quantized colorant values in the customized TRC curve; and
an image rendering unit that provides an image output including the pixel colorant at each one pixel, wherein the quantized colorant value for the odd index values is computed using the following equations: $C'=\text{floor}(C/2)*2+1$; $M'=\text{floor}(M/2)*2+1$; $Y'=\text{floor}(Y/2)*2+1$; and $K'=\text{floor}(K/2)*2+1$, and the quantized colorant value for the even indexed values is computed using the following equations: $C'=\text{floor}(C/2)*2$; $M'=\text{floor}(M/2)*2$; $Y'=\text{floor}(Y/2)*2$; and $K'=\text{floor}(K/2)*2$.

22. The apparatus of claim 21, wherein the image rendering unit is further adapted to:
determine whether each of the processed pixels is odd or even;
map odd CMYK values to a customized TRC value;
map even CMYK values to the original TRC values; and
generate an output having fixed color at the non-VI pixels and customized color at the VI pixels.

23. The apparatus of claim 22, wherein the image rendering unit is further adapted to store even quantized colorant values in an original TRC curve.

* * * * *